J. ESPOSITO.
PEANUT-HEATER.
No. 184,069. Patented Nov. 7, 1876.
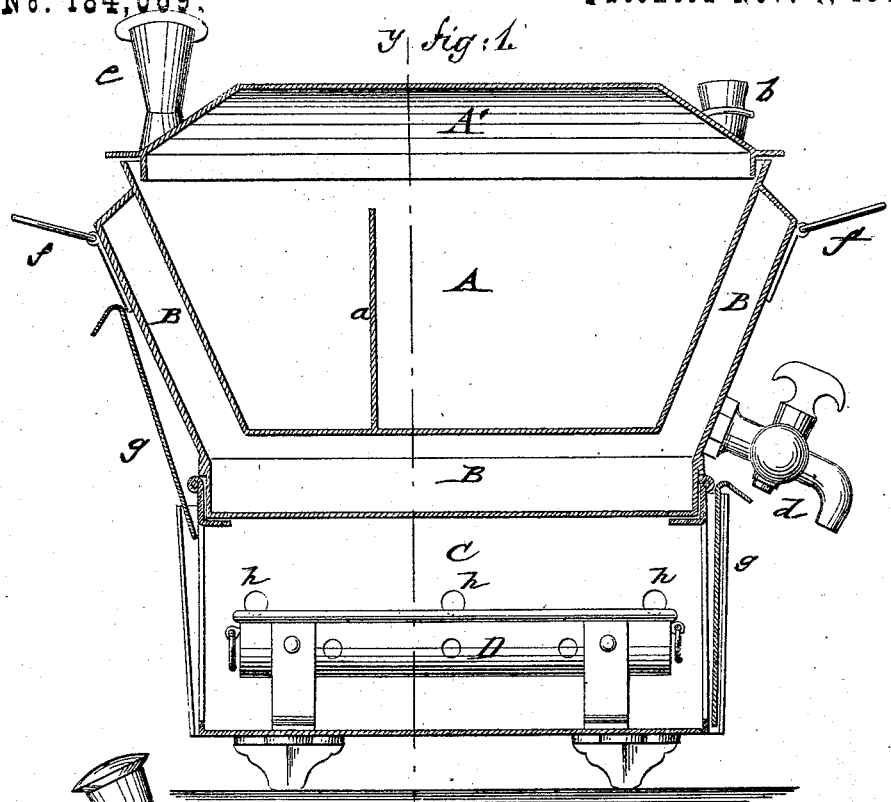
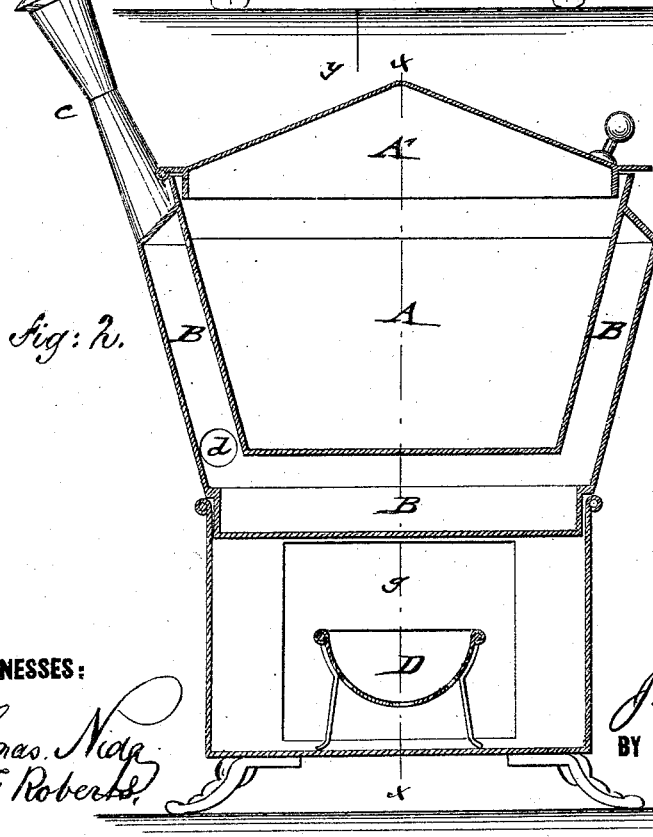
WITNESSES:
Chas. Nida
Alex F. Roberts
INVENTOR:
J. Esposito
BY
ATTORNEYS.

UNITED STATES PATENT OFFICE.

JEAN ESPOSITO, OF NEW YORK, N. Y.

IMPROVEMENT IN PEA-NUT HEATERS.

Specification forming part of Letters Patent No. 184,069, dated November 7, 1876; application filed October 14, 1876.

*To all whom it may concern:*

Be it known that I, JEAN ESPOSITO, of the city, county, and State of New York, have invented a new and Improved Pea-Nut Heater, of which the following is a specification:

In the accompanying drawing, Figure 1 represents a vertical longitudinal section on line $x\ x$, Fig. 2, and Fig. 2 a vertical transverse section on line $y\ y$, Fig. 1, of my improved pea-nut heater.

Similar letters of reference indicate corresponding parts.

The object of my invention is to provide a neat and convenient heater for pea-nuts, chestnuts, and similar articles, by which they may be kept in heated state after being roasted without losing any of their freshness and brittleness; and the invention consists of a top receptacle with hinged cover, surrounded at the sides and bottom with a water-chamber that is heated by a charcoal-furnace in the base or supporting-chamber or section of the heater.

In the drawing, A represents the top receptacle of my improved pea-nut heater, which is preferably made of tapering shape, being wider at the upper than at the lower part. The receptacle A is closed by a hinged cover or lid, A', that fits tightly to the same. One or more lateral partitions, $a$, are arranged at the inside of the receptacle, for the purpose of allowing the storage of the roasted pea-nuts, chestnuts, and similar articles, without getting them mixed.

The pea-nuts, &c., are placed in the receptacle after being roasted, for the purpose of being kept in a heated state therein without losing their peculiar flavor and freshness.

To accomplish this, the pea-nut receptacle A is heated by a water-bath, that is formed of a water-chamber, B, extending around the sides and below the bottom of the receptacle A, and corresponding in shape to the same. The water-chamber B is provided with a funnel, $b$, at the top part, for being filled, and with a discharge-cock, $d$, at the lower part, for drawing the water off or adjusting the height of the same in the water-chamber, as desired. The water-chamber is further provided with a steam-whistle, $e$, as commonly used in pea-nut heaters. The heater is carried by handles $f$ applied to the shorter sides of the same. The lower part of the water-chamber B is seated in a base or supporting part, C, and is preferably riveted or otherwise secured thereto, so as to form one apparatus therewith. The base part C is placed on corner feet or supports, and provided at the shorter ends with slides $g$, through which a small charcoal-furnace, D, supported on legs, is introduced into the lower chamber for heating up the water-bath. Side apertures $h$ of the base part C admit the air to the charcoals, and keep up the burning of the same, which may be accelerated, if desired, by opening one or both of the end slides, to increase the draft. The charcoal-furnace provides thus the steady heat required for heating the water-bath, which again imparts the required heat to the pea-nuts without wilting, browning, or parching the same. They may thereby be kept in the heater for considerable time, and be sold at any moment in a perfectly fresh and heated state without getting spoiled and burned, as in the present pea-nut roaster and heaters.

Having thus described my invention, I claim as new and desire to secure by Letters Patent—

A pea-nut heater composed of a covered storage-receptacle, A, a water-chamber, B, surrounding the same at the sides and bottom, and of a base or supporting part with end slides and side apertures for charcoal-furnace, substantially in the manner and for the purpose set forth.

JEAN ESPOSITO.

Witnesses:
PAUL GOEPEL,
EDOUARD TAUNAY.